US009898334B1

(12) United States Patent
Dongare et al.

(10) Patent No.: US 9,898,334 B1
(45) Date of Patent: Feb. 20, 2018

(54) METHOD AND APPARATUS FOR SCHEDULING PROCESSING TASKS IN A PIPELINED ENGINE

(71) Applicant: Microsemi Solutions (U.S.), Inc., Aliso Viejo, CA (US)

(72) Inventors: Anil B. Dongare, Bangalore (IN); Lijish Remani Bal, Bangalore (IN); Janardan Prasad, Burnaby (CA); David Joseph Clinton, Coopersburg, PA (US)

(73) Assignee: Microsemi Solutions (U.S.), Inc., Aliso Viejo, CA (US)

( * ) Notice: Subject to any disclaimer, the term of this patent is extended or adjusted under 35 U.S.C. 154(b) by 93 days.

(21) Appl. No.: 14/926,696

(22) Filed: Oct. 29, 2015

(51) Int. Cl.
*G06F 9/46* (2006.01)
*G06F 9/48* (2006.01)
*G06F 13/42* (2006.01)
*G06F 21/60* (2013.01)

(52) U.S. Cl.
CPC ........ *G06F 9/4881* (2013.01); *G06F 13/4282* (2013.01); *G06F 21/602* (2013.01)

(58) Field of Classification Search
None
See application file for complete search history.

(56) References Cited

U.S. PATENT DOCUMENTS

| 8,601,169 B1 | 12/2013 | Paragaonkar et al. |
| 2007/0177581 A1* | 8/2007 | Rodgers ............... H04L 47/10 370/352 |
| 2013/0179664 A1 | 7/2013 | Olson et al. |

* cited by examiner

*Primary Examiner* — Emerson Puente
*Assistant Examiner* — Steven Do
(74) *Attorney, Agent, or Firm* — Leber IP Law; Dennis R. Haszko

(57) ABSTRACT

The present disclosure provides a method of scheduling data processing at a pipelined data processing engine, and a command scheduler for scheduling data processing at the pipelined data processing engine. The command scheduler determines whether a first data stream is locked to the pipelined data processing engine based on a status of a current data frame of the first data stream in the pipelined data processing engine. The command scheduler will schedule a next data frame of the first data stream to the data processing engine if the first data stream is not locked to the pipelined data processing engine, or it will postpone the scheduling of the next data frame of the first data stream if the first data stream is locked to the pipelined data processing engine.

11 Claims, 16 Drawing Sheets

METHOD AND APPARATUS FOR SCHEDULING PROCESSING TASKS IN A PIPELINED ENGINE

FIELD

The present disclosure relates to parallel data processing and pipelined data processing engines.

BACKGROUND

Parallel-task processors (having multiple hardware engines and/or capable of handling multiple threads per engine) are known for parallel processing tasks. Because it may be difficult or impossible in a given system for a single engine to process data fast enough to support a throughput requirement, parallel processing with multiple engines may be employed to meet a throughput performance target. Thus, the processing rate of the combination of hardware engines determines the overall system processing rate, which is commonly a bottleneck in the system's throughput.

FIG. 1 shows an exemplary storage system known in the art. The system 100 comprises an 8-lane PCIe (Peripheral Component Interconnect Express) Gen. 3 link 101 as the interface between a host 110 and a storage controller 111. The bandwidth of the PCIe link is 8.0 GB/s (8 lanes*8 Gb/s per lane=64 Gb/s=8.0 GB/s). Assuming that 95% of the PCIe bandwidth is used for actual data, and the other 5% is used for overhead, the available bandwidth for PCIe data on the link is 7.6 GB/s (0.95*8.0 GB/s=7.6 GB/s). The system 100 also comprises a 16-lane SAS 2.0 (Serial Attached Small Computer System Interface) link 102 as the interface between the storage controller 111 and the storage devices 112. The SAS interface bandwidth is 12 GB/s (16 lanes*6 Gb/s per lane=96 Gb/s=12 GB/s). Assuming that 85% of the SAS bandwidth is used for actual data, and the other 5% is used for overhead, the available bandwidth for SAS data on the link is 10.2 GB/s (0.85*12 GB/s=10.2 GB/s).

Therefore, in this exemplary storage system, the minimum required throughput is 7.6 GB/s. It is difficult to get single hardware engine to process data fast enough in order to handle 7.6 GB/s traffic.

A known solution to this performance bottleneck is the use of multiple instances of the hardware engine such that the required processing bandwidth can be distributed across the multiple instances of the hardware engine. Depending on the interface bandwidth, the system can be scaled to meet different performance requirements. For example, in an IO (input/output) processing system that uses high speed interfaces, such as a PCIe (PCIe Gen 3, 8 Gbps) for host interface and SAS (SAS 2.0, 6 Gbps) for disk interface as described above, where the IO processing rate is limited by the speed of the data processing engine, multiple data processing engines can be integrated into the system to match the processing throughput with the interface throughput.

The storage controller of the storage system example above may use encryption hardware to encrypt data from the host before it is written to the storage devices. Typical encryption hardware engines have a throughput of approximately 1.5 GB/s. Therefore, at least 6 instances of the encryption hardware engine are required to meet the 7.6 GB/s PCIe bandwidth.

In command-based IO processing systems, to maintain IO coherency in a data flow, the storage controller has an IO processor (IOP) that splits the IO data into small frames and creates separate IO commands for each IO data frame. Each IO command describes how the respective IO data should be processed by system.

For example, consider an IO operation where 64 KB of raw data is transferred from host to disk and encryption is performed on every 4 KB sector of data. For such an IO operation, the IOP may initiate multiple data transfers, each transfer moving 1 KB of data from host memory into on-chip memory. The IOP will then create commands for the encryption engine(s) of the storage controller to process each of the 1 KB data blocks. These commands are loaded into a command queue.

Since each 1 KB block represents a fraction of one full encryption data sector (4 KB), intermediate Initial Value (IV) results are obtained after processing each 1 KB block of data. These IVs are stored in a global data structure, called an IO context, for each 4 KB sector of IO data. The partial result at the end of the first 1 KB block needs to be updated in the IO context before the second 1 KB block can start processing. The encryption for the second 1 KB block is calculated starting with the IV obtained from processing the first 1 KB block. This means that the IO data blocks of the same IO data sector need to be processed in sequence. This also implies that two IO data blocks of the same IO data sector cannot be processed in parallel on two different encryption engine instances at the same time.

Processing data in separate operations in parallel (either in different threads of an engine or in different hardware engines) creates scheduling requirements such as the ones described above. Additional scheduling problems may arise based on various inefficiencies of the processor associated with these scheduling requirements. It is, therefore, desirable to mitigate or obviate these inefficiencies and their deleterious effects.

BRIEF DESCRIPTION OF THE DRAWINGS

Embodiments of the present disclosure will now be described, by way of example only, with reference to the attached Figures.

DETAILED DESCRIPTION

Figure 1:
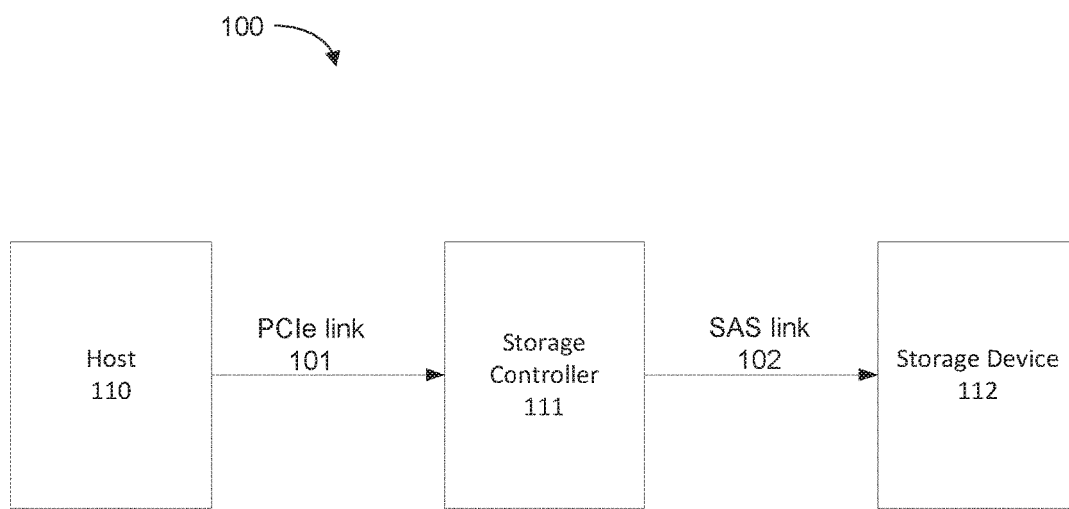
FIG. 1 is a diagram of an exemplary storage system known in the art.

Generally, the present disclosure provides a method of scheduling data processing at a pipelined data processing engine, and a command scheduler for scheduling data processing at the pipelined data processing engine.

The pipelined data processing engine may receive a plurality of data streams, each comprising sequential data frames including a current data frame and a next data frame. The command scheduler determines whether a first data stream is locked to the pipelined data processing engine based on a status of the current data frame of the first data stream in the pipelined data processing engine. The command scheduler will schedule the next data frame of the first data stream to the data processing engine if the first data stream is not locked to the pipelined data processing engine, or it will postpone the scheduling of the next data frame of the first data stream if the first data stream is locked to the pipelined data processing engine.

By postponing the scheduling of the next data frame of the first data stream if the first data stream is locked to the pipelined data processing engine, the command scheduler can avoid or reduce the incidence of locking conditions and may improve the overall throughput of the plurality of data streams at the data processing engine.

An embodiment of the present disclosure provides a method of scheduling data processing at a pipelined data processing engine, the method comprising: receiving a plurality of data streams, each data stream comprising sequential data frames including a current data frame and a next data frame; determining whether a first data stream is locked to the pipelined data processing engine based on a status of the current data frame of the first data stream in the pipelined data processing engine; scheduling the next data frame of the first data stream to the data processing engine if the first data stream is not locked to the pipelined data processing engine; and postponing the scheduling of the next data frame of the first data stream if the first data stream is locked to the pipelined data processing engine.

In a further embodiment, the pipelined data processing engine comprises a plurality of pipeline stages for receiving and storing input/output (IO) commands comprising instructions for processing data frames, the plurality of pipeline stages including a command pre-fetch stage, a command buffer stage, a command execution stage, and a command output stage.

In yet a further embodiment, the first data stream is locked to the pipelined data processing engine when: a threshold number of pipeline stages of the pipelined data processing engine are occupied by IO commands, one of the pipeline stages of the pipelined data processing engine is occupied by an IO command of a second data stream, and one of the command execution stage or the command output stage is occupied by an IO command of the current data frame of the first data stream.

In yet a further embodiment, the first data stream is locked to the pipelined data processing engine when: the pre-fetch stage of the pipelined data processing engine is occupied by either the IO command of the current data frame of the first data stream or another IO command of another data stream, the command buffer stage is occupied by either the IO command of the current data frame of the first data stream or another IO command of another data stream, or the command execution stage is occupied by either the IO command of the current data frame of the first data stream or another IO command, and the command output stage is occupied by either the IO command of the current data frame of the first data stream or another IO command.

In yet a further embodiment, one of the command pre-fetch stage, the command buffer stage, the command execution stage, or the command output stage comprises multiple sub-stages.

In yet a further embodiment, the pipelined data processing engine is an encryption engine of a Serial Attached Small-Computer-System-Interface (SAS) controller.

Another embodiment of the present disclosure provides a processor comprising: a pipelined data processing engine for processing a plurality of data streams, each data stream comprising sequential data frames including a current data frame and a next data frame, the pipelined data processing engine configured to process the data frames based on instructions contained in input/output (IO) commands; and a command scheduler for scheduling data processing at the pipelined data processing engine, wherein the command scheduler is configured to: receive IO commands corresponding to different data streams, the IO commands comprising a current IO command corresponding to a current data frame of a first data stream, and comprising a next IO command corresponding to a next data frame of the first data stream; determine whether the first data stream is locked to the pipelined data processing engine based on a status of the current IO command of the first data stream in the pipelined data processing engine; schedule the next data frame of the first data stream to the data processing engine if the first data stream is not locked to the pipelined data processing engine, wherein scheduling the next data frame comprises transmitting the next IO command to the pipelined data processing engine; and postpone the scheduling of the next data frame of the first data stream if the first data stream is locked to the pipelined data processing engine.

In a further embodiment, the pipelined data processing engine comprises a plurality of pipeline stages for receiving and storing the IO commands, the plurality of pipeline stages including a command pre-fetch stage, a command buffer stage, a command execution stage, and a command output stage.

In yet a further embodiment, the first data stream is locked to the pipelined data processing engine when: a threshold number of pipeline stages of the pipelined data processing engine are occupied by IO commands, one of the pipeline stages of the pipelined data processing engine is occupied by an IO command of a second data stream, and one of the command execution stage or the command output stage is occupied by an IO command of the current data frame of the first data stream.

In yet a further embodiment, the first data stream is locked to the pipelined data processing engine when: the pre-fetch stage of the pipelined data processing engine is occupied by either the IO command of the current data frame of the first data stream or another IO command of another data stream, the command buffer stage is occupied by either the IO command of the current data frame of the first data stream or another IO command of another data stream, or the command execution stage is occupied by either the IO command of the current data frame of the first data stream or another IO command, and the command output stage is occupied by either the IO command of the current data frame of the first data stream or another IO command.

In yet a further embodiment, one of the command pre-fetch stage, the command buffer stage, the command execution stage, or the command output stage comprises multiple sub-stages.

In yet a further embodiment, the pipelined data processing engine is an encryption engine of a Serial Attached Small-Computer-System-Interface (SAS) controller.

Other aspects and features of the present disclosure will become apparent to those ordinarily skilled in the art upon review of the following description of specific embodiments in conjunction with the accompanying figures.

Figure 2:
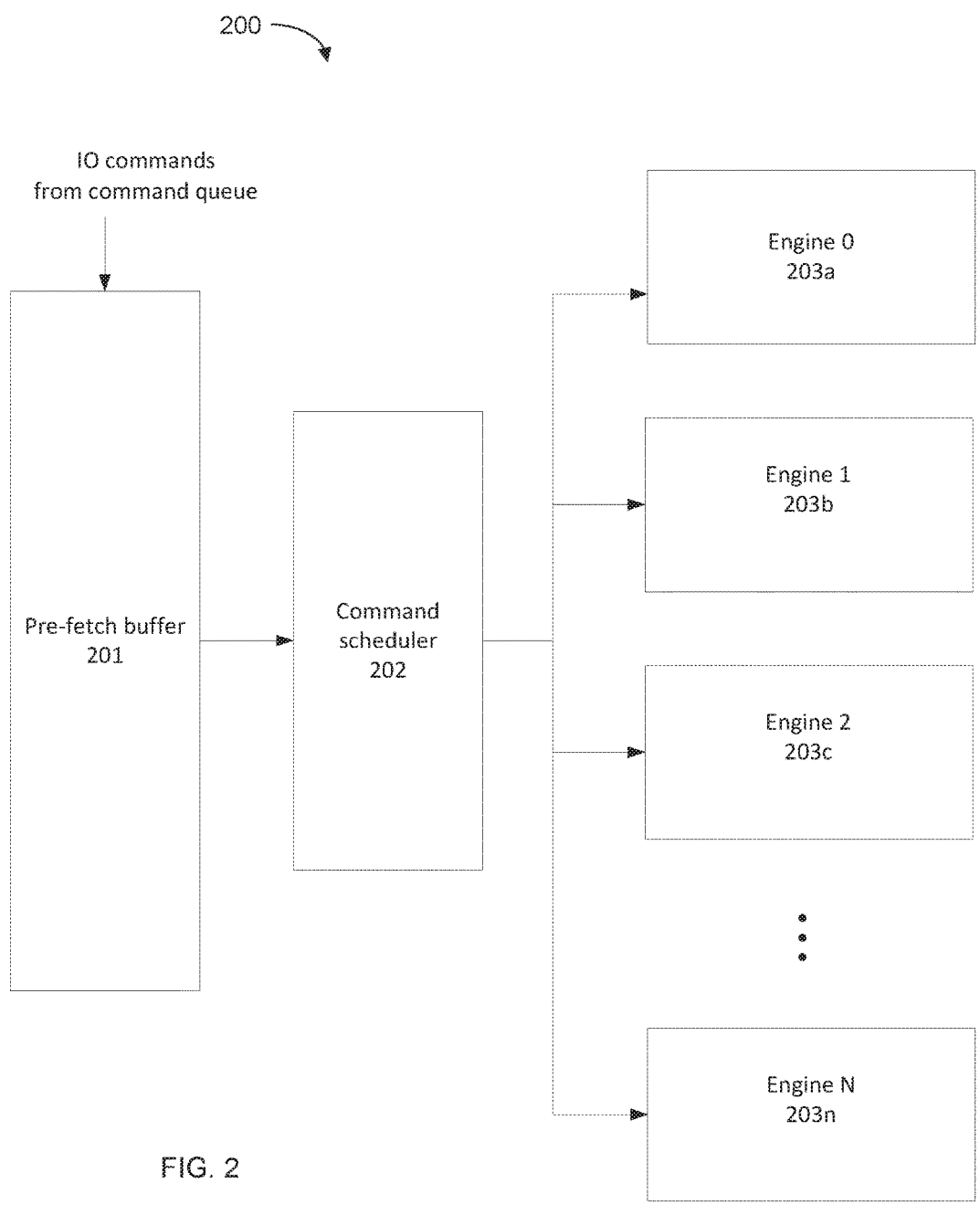
FIG. 2 is a block diagram of a processor according to an embodiment of the present disclosure.

FIG. 2 shows a processor according to an embodiment of the present disclosure. The processor 200 may be a part of a larger integrated circuit, such as a storage controller for example. The processor 200 comprises a pre-fetch buffer 201, a command scheduler 202, and a plurality of processor engines 203a-203n. The pre-fetch buffer 201 receives IO commands from an IO processor that splits IO data into small frames and creates separate IO commands for each IO data frame. The pre-fetch buffer 201 stores the IO commands and provides the IO commands to the command scheduler 202.

The command scheduler 202 receives the IO commands from the pre-fetch buffer 201 in the order that the IO commands are loaded into the buffer 201 and sends the IO commands to a selected engine of the plurality 203a-203n based on scheduling priority and other factors to optimize the overall IO throughput of the processor.

The engines 203a-203n receive IO commands from the command scheduler 202 according to a schedule selected by the scheduler 202. The IO command instructs the engine to retrieve and process an IO data frame stored in the memory of the system. The memory may be part of the processor 200, or connected to the processor 200, or otherwise accessible to the processor 200 through another circuit.

The command scheduler 202 may postpone or temporarily skip certain IO commands in favor of others in order to improve the overall processor throughput. In contrast, conventional command schedulers known in the art schedule command IOs to the plurality of engines as soon as those command IOs are ready to be scheduled to an engine.

Figure 3:
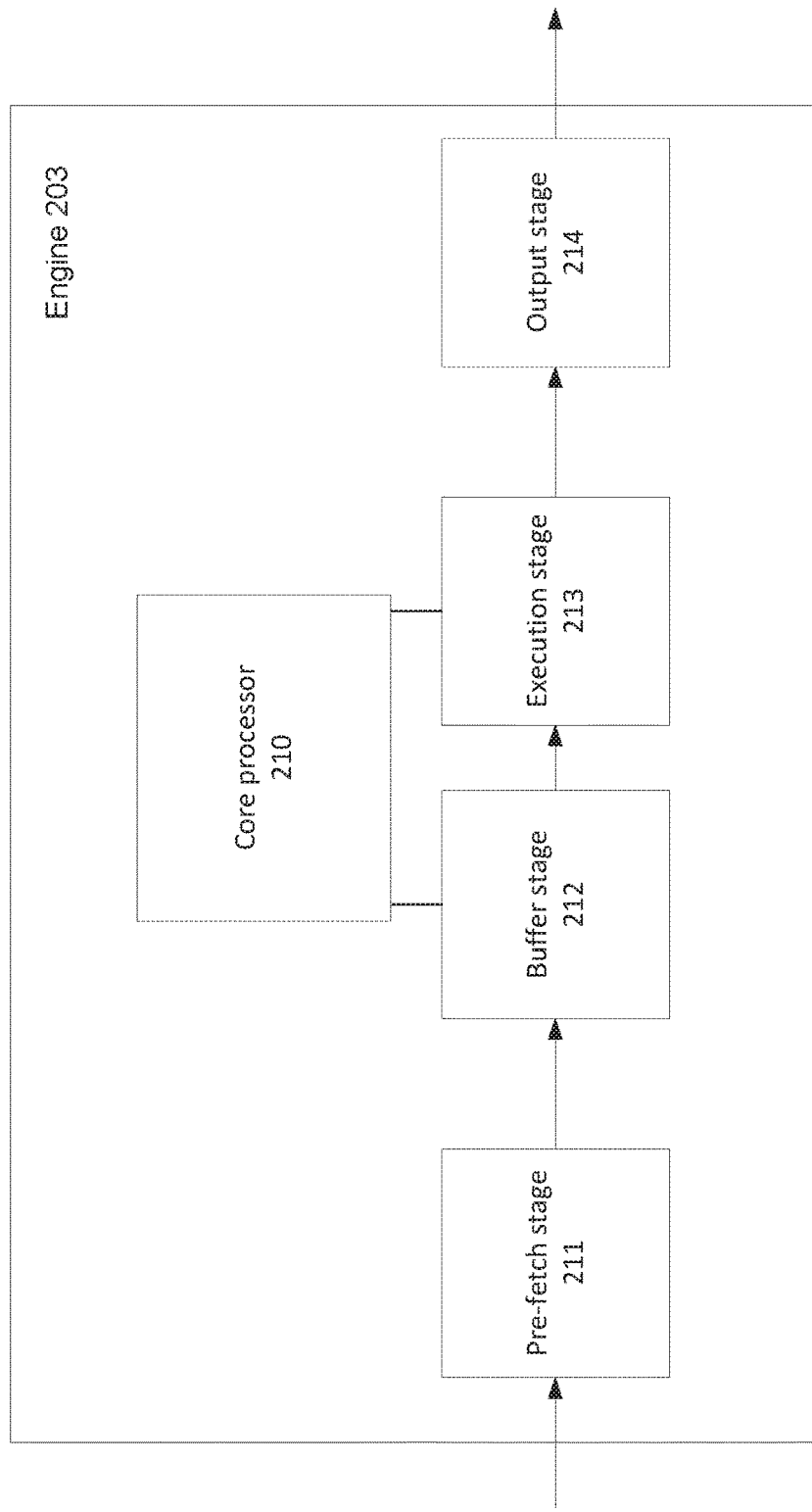
FIG. 3 is a block diagram of an engine according to an embodiment of the present disclosure.

FIG. 3 shows an engine according to an embodiment of the present disclosure. The engine 203 of the processor 200 has a core processor 210 and four pipeline stages: a pre-fetch stage 211, a buffer stage 212, an execution stage 213, and an output stage 214. In other embodiments of the present disclosure, more or less pipeline stages are possible. However, these four pipeline stages are shown in the engine 203 of FIG. 3 as an example. Configuring a data processing engine into multiple pipelined stages often improves the performance of the data processing engine.

The engine 203 is command driven. This means that the core processor 210 of the engine reads IO data from an input device, such as a data memory, processes the data and writes the processed data to an output device. The IO data is transferred from the input device to the output device in the form of data frames. That is, the IO data transfer is split into multiple data frames and one command is created to process each frame. The size of the data frame may vary based on the application of the processor 200. The core processor 210 acts on the IO commands occupied in the pipeline stages of the engine 203.

The command scheduler 202 sends these IO commands to the engine 203. The commands instruct the engine 203 about which data frames to process. The commands are processed by the engine 203 through a series of pipeline stages.

The pre-fetch stage 211 is used to store the latest IO command scheduled to the engine 203 by the command scheduler 202. While the latest IO command is scheduled to the engine 203, the engine may be currently processing a previous IO command. In order to schedule the latest IO command to the engine, the pre-fetch stage 211 must be empty. The pre-fetch stage acts as a buffer stage and no control information is extracted from the IO command loaded in the pre-fetch stage 211.

The buffer stage 212 receives the latest IO command from the pre-fetch stage 211 and buffers the latest IO command. Whenever the buffer stage 212 is empty and the pre-fetch stage 211 is occupied, the IO command in the pre-fetch stage 211 will be loaded into buffer stage 212. The IO command buffered in the buffer stage 212 instructs the core processor 210 to launch its data read if the core processor 210 is free, or if it has completed reading the data from the IO command in the execution stage 213. Therefore, the buffer stage 212 readies data to be processed at the core processor 210 once the data input of the core processor 210 is free. In further embodiments, the buffer stage 212 may be separated into multiple sub-stages.

The execution stage 213 receives the latest IO command from the buffer stage 212 and processes the latest IO command. Whenever the execution stage 213 is empty and the buffer stage 212 is occupied, the IO command in the buffer stage 212 will be loaded into execution stage 213. When the IO command is loaded in the execution stage 213, the data associated with the IO command is being read, processed and written to a data port by the core processor 210. Once the core processor 210 has completed the reading and processing, the core processor 210 can write the processed data to a data output and the execution stage 213 can pass the IO command to the next pipeline stage.

The output stage 214 receives the processed latest IO command and stores the processed latest IO command. Once the core processor 210 has completed reading and processing the data referenced by the IO command in the execution stage 213, the IO command is moved from the execution stage 213 to the output stage 214. The IO command is stored in the output stage 214 to wait for the core processor 210 to complete writing the processed data to the data output. Once the write back operation is complete, the IO command is removed from the pipeline and the output stage 214 is cleared and ready to store a next IO command.

When the command scheduler 202 schedules an IO command to the engine 203, the command scheduler 202 creates a processing dependency in the engine 203. The processing dependency is caused by the engine 203 only processing a fraction of IO data at a time. For example, a given processing algorithm works in data sizes of 4 KB. If an engine processes the 4 KB of data in 1 KB pieces over a period of time, the engine must process those 1 KB pieces in a proper order so that the processing is equivalent to processing the whole 4 KB of data at once.

If the data to be processed belongs to a single data stream, the data processing engine will process the data pieces in order.

If the data to be processed belongs to multiple data streams, the data processing engine may process the multiple data streams in parallel by concurrently scheduling the data streams to the data processing engine. This parallel processing approach is commonly known as multithreading. Due to the dependency of processing a sequence of data within an engine, there exists a possibility that a multi-threaded engine can become locked into only processing data for one or more particular data streams (or threads).

In a multithreaded, multi-engine processor, this locking phenomenon may reduce the overall efficiency and throughput of the processor. When a particular data stream is locked to a particular engine, that data stream cannot be scheduled to another engine with more capacity to process the locked data stream. This inefficient locking phenomenon is described in the examples below.

FIGS. 4a-4e shows an example of a locking phenomenon in a multithreaded processor comprising four encryption engines. The processor 300 comprises a pre-fetch buffer 301, a command scheduler 302, and encryption engines 303a-303d. Each engine 303a-303d has a core processor 310a-310d and four pipeline stages: a pre-fetch stage 311a-311d, a buffer stage 312a-312d, an execution stage 313a-313d, and an output stage 314a-314d.

The processor 300 is part of a system having 6 PHYs (physical layer interfaces). Each PHY is associated with a data stream (data streams A to F) and IO commands (IO_A to IO_F) for each data stream. Each PHY transmits data at a rate of approximately 1 GB/s; thus, the maximum overall throughput of the processor 300 should be approximately 6 GB/s.

Since there are only four encryption engines 303a-303d for handling the six data streams, each engine is designed to encrypt data at a rate of 1.5 GB/s. If the command scheduler 302 efficiently balances the IO commands between the four engines 303a-303d, the overall encryption rate of the four engines will be approximately 6 GB/s.

The command scheduler 302 observes the following rules when determining how to schedule an IO command. The IO command will be scheduled to a selected engine if the engine's first pipeline stage (the pre-fetch stage 311) is free or unoccupied by any previous IO command. If a previous IO command of the same data stream is already scheduled to a particular engine of the processor 300 (that is, the previous IO command occupies any pipeline stage of that engine), then the command scheduler 302 must schedule the next IO command to that same engine so that the same engine performs the encryption operation on both pieces of data in the data stream. If no engine of the processor 300 is currently scheduled to a previous IO command of the same data stream (that is, the previous IO command does not occupy any pipeline stage of any engine), then the command scheduler 302 can schedule the next IO command to any engine with a free pre-fetch stage 311.

Figure 4A:
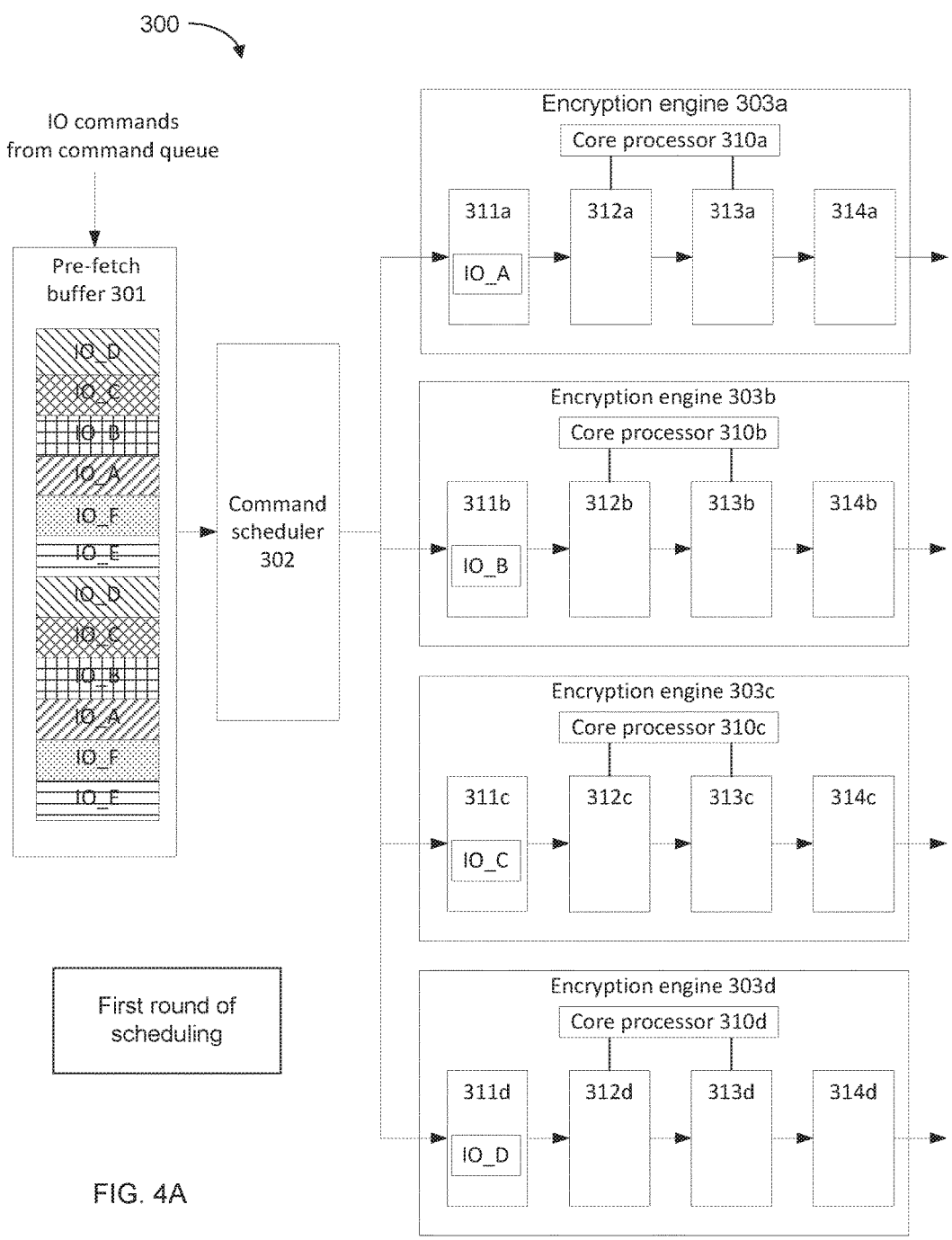
FIGS. 4A-4F are diagrams of a processor experiencing an example of a locking phenomenon over six rounds of scheduling.

FIG. 4a shows a first round of scheduling, in which the scheduler 302 schedules: IO_A to engine 303a, IO_B to engine 303b; IO_C to engine 303c; and IO_D to engine 303d. In this first round, the assignments of IO commands to engine are arbitrary because all of the engines are free and none of the engines are processing a previous IO command of any data stream.

Figure 4B:
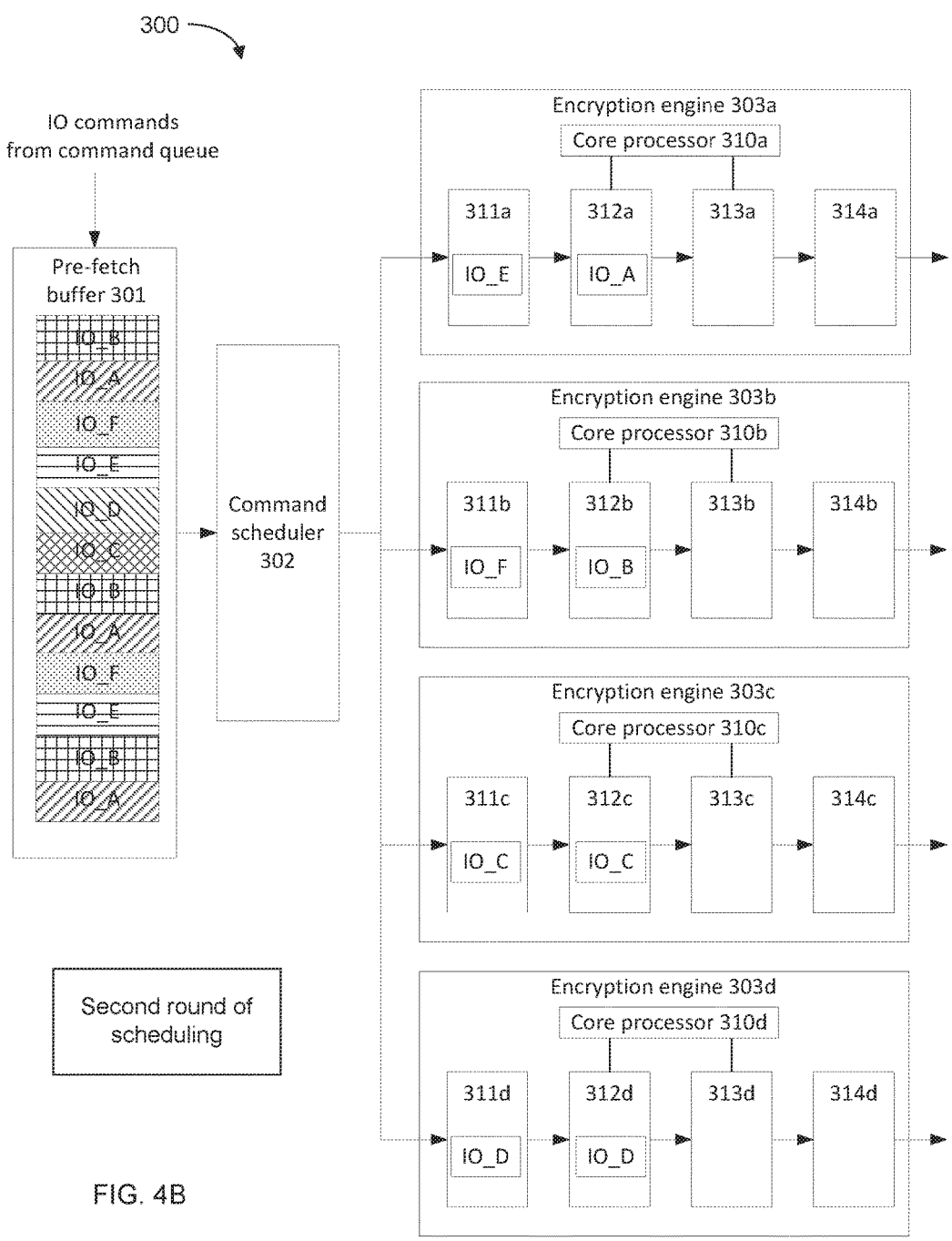

FIG. 4b shows a second round of scheduling. IO_A moves from the pre-fetch stage 311a to the buffer stage 312a. The command scheduler 302 schedules IO_E to engine 303a because the pre-fetch stage 311a is free. The command scheduler 302 is not bound to schedule IO_E to any other engine because no other engine has a previous IO_E currently occupying any pipeline stage.

Similarly, the command scheduler 302 schedules IO_F to engine 303b because the pre-fetch stage 311b is free.

The command scheduler 302 cannot schedule the next IO_A and IO_B commands. Since a previous IO_A command is pending in buffer stage 312a, the command scheduler 302 must schedule the next IO_A command to the engine 303a. However, the pre-fetch stage 311a of the engine 303a is already occupied by IO_E. Similarly, the command scheduler 302 must schedule the next IO_B command to the engine 303b because the previous IO_B command already occupies buffer stage 312b. However, the pre-fetch stage 311b is already occupied by IO_F.

The next IO_A and IO_B commands remain in the pre-fetch buffer 301.

The command scheduler 302 proceeds to fill the empty pre-fetch stages 311c and 311d with the next IO_C and next IO_D commands, respectively.

Figure 4C:
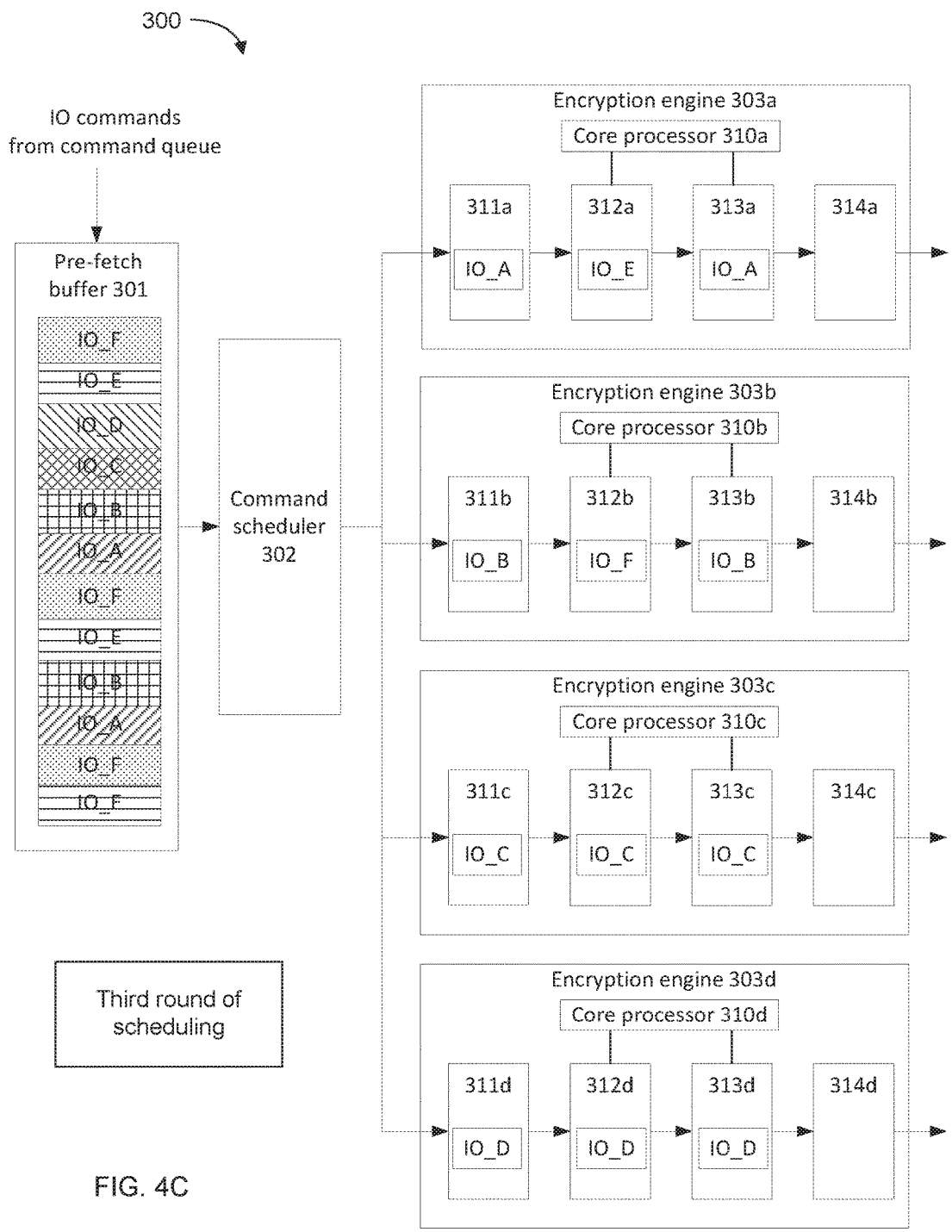

FIG. 4c shows a third round of scheduling. In the engine 303a, IO_A and IO_E each move to the next pipeline stages, freeing up the pre-fetch stage 311a to accept a next IO command. Since the command scheduler 302 could not schedule IO_A in the last round, the command scheduler 302 attempts to schedule the next IO_A command. Again, the command scheduler 302 must schedule the next IO_A command to the engine 303a because the previous IO_A command occupies the execution stage 313a. Thus, the command scheduler 302 schedules the next IO_A command to the free pre-fetch stage 311a.

For similar reasons, the command scheduler 302 schedules the next IO_B command to the free pre-fetch stage 311b.

The command scheduler 302 cannot schedule the next IO_E and IO_F commands. Since a previous IO_E command is pending in buffer stage 312a, the command scheduler 302 must schedule the next IO_E command to the engine 303a. However, the pre-fetch stage 311a of the engine 303a is already occupied by IO_A. Similarly, the command scheduler 302 must schedule the next IO_F command to the engine 303b because the previous IO_F command already occupies buffer stage 312b. However, the pre-fetch stage 311b is already occupied by IO_B.

The next IO_E and IO_F commands remain in the pre-fetch buffer 301.

The two IO_C commands in the engine 303c each move to the next pipeline stage, freeing up the pre-fetch stage 311c. The two IO_D commands in the engine 303d each move to the next pipeline stage, freeing up the pre-fetch stage 311d. Thus, the command scheduler fills the empty pre-fetch stages 311c and 311d with the next IO_C and next IO_D commands, respectively.

Figure 4D:
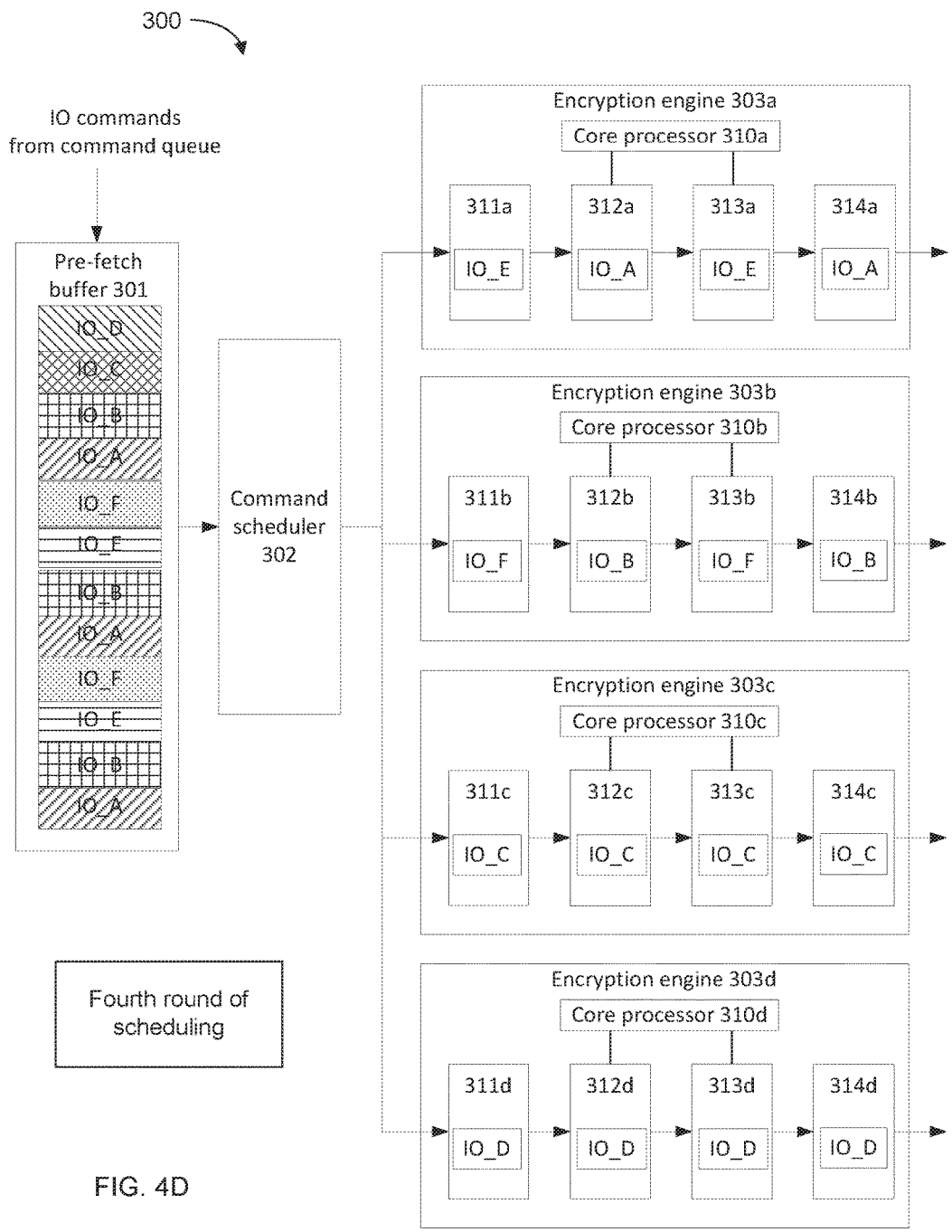

FIG. 4d shows a fourth round of scheduling. In the engine 303a, IO_A and IO_E commands each move to the next pipeline stages, freeing up the pre-fetch stage 311a to accept a next IO command. Since the command scheduler 302 could not schedule IO_E in the last round, the command scheduler 302 attempts to schedule the next IO_E command. Again, the command scheduler 302 must schedule the next IO_E command to the engine 303a because the previous IO_E command occupies the execution stage 313a. Thus, the command scheduler 302 schedules the next IO_E command to the free pre-fetch stage 311a.

For similar reasons, the command scheduler 302 schedules the next IO_F command to the free pre-fetch stage 311b.

The command scheduler 302 cannot schedule the next IO_A and IO_B commands. Since previous IO_A commands are pending in the buffer stage 312a and the output stage 314a, the command scheduler 302 must schedule the next IO_A command to the engine 303a. However, the pre-fetch stage 311a of the engine 303a is already occupied by IO_E. Similarly, the command scheduler 302 must schedule the next IO_B command to the engine 303b because previous IO_B commands already occupy the buffer stage 312b and the output stage 314b. However, the pre-fetch stage 311b is already occupied by IO_F.

The next IO_A and IO_B commands remain in the pre-fetch buffer 301.

The three IO_C commands in the engine 303c each move to the next pipeline stage, freeing up the pre-fetch stage 311c. The three IO_D commands in the engine 303d each move to the next pipeline stage, freeing up the pre-fetch stage 311d. Thus, the command scheduler fills the empty pre-fetch stages 311c and 311d with the next IO_C and next IO_D commands, respectively.

Figure 4E:
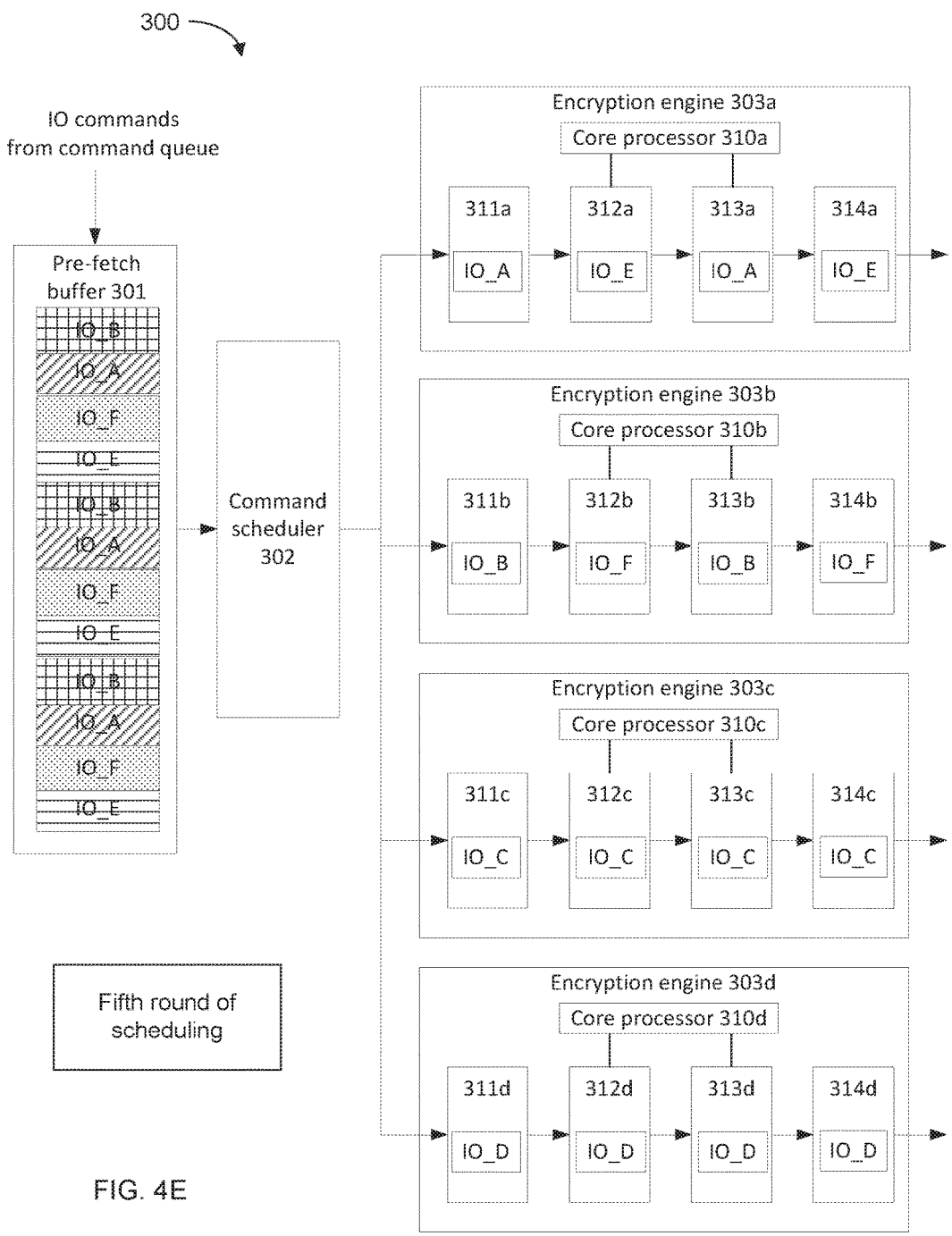

FIG. 4e shows a fifth round of scheduling. As established in previous rounds, in FIGS. 4c and 4d, both of the IO_A and IO_E commands are locked to the engine 303a, while both of the IO_B and IO_F commands are locked to the engine 303b. Since each engine 303a-303d has an approximate throughput of 1.5 GB/s, the effective throughput of the PHY of the data stream A is only 0.75 GB/s, which is below the desired 1 GB/s. Similarly, the throughputs of the PHYs of each data stream B, E, and F are each only 0.75 GB/s.

Conversely, the processor 300 has so far been able to maintain a 1 GB/s throughput for the PHYs of the data streams C and D.

Figure 4F:
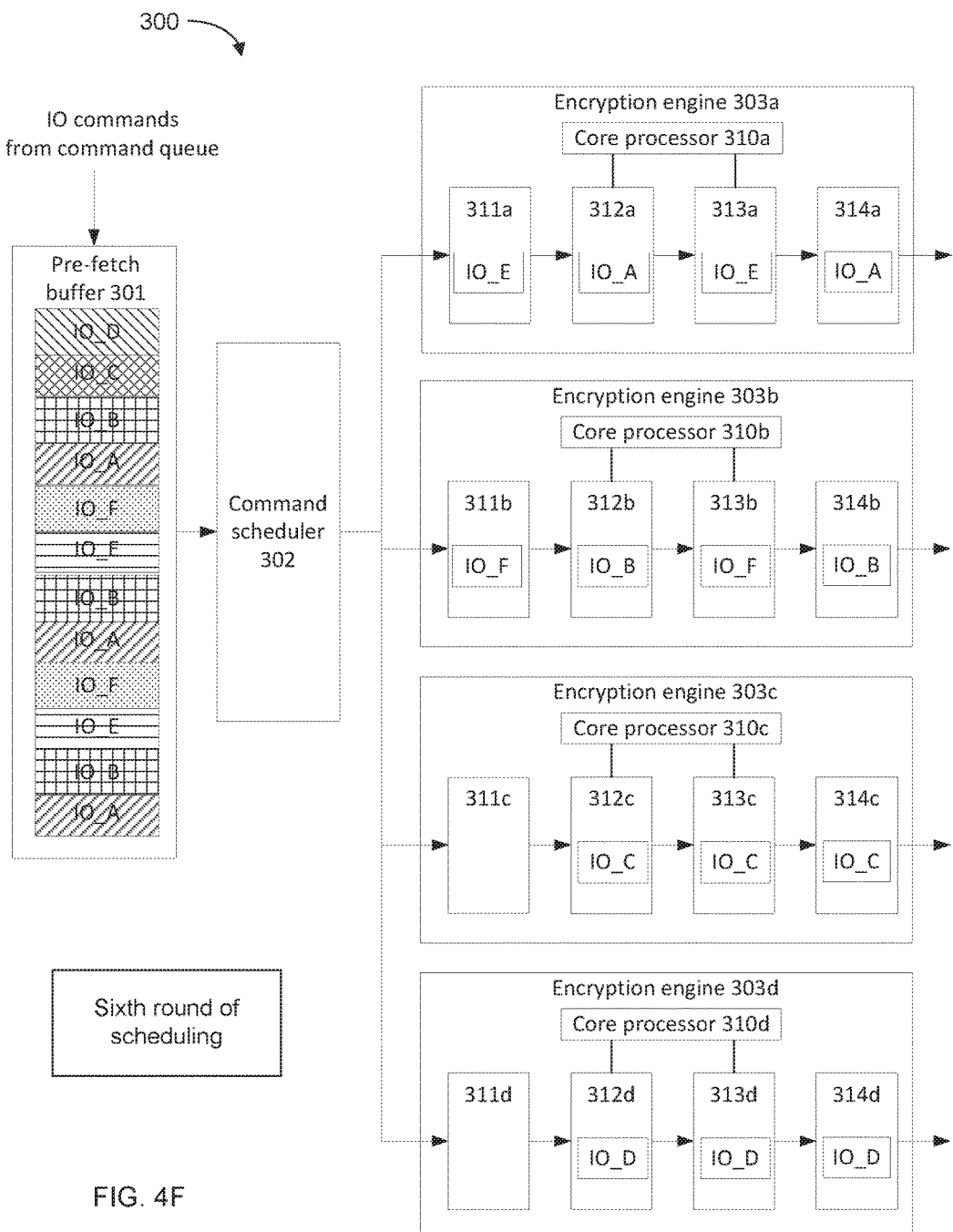

However, FIG. 4f show that engines 303c and 303d can become starved, which will eventually reduce the throughputs of the PHYs of data streams C and D. Since the processor 300 cannot schedule the IO_A, IO_B, IO_E, and IO_F commands at 1 GB/s, the pending commands build up in the pre-fetch buffer 301. By the fifth round of scheduling, the IO_A, IO_B, IO_E, and IO_F commands have backed up such that there are no IO_C and IO_D commands in the pre-fetch buffer 301. Thus, in the sixth round of scheduling the engines 303c and 303d will be starved of IO commands. The engines will be starved because the IO_A and IO_E commands are each locked to the engine 303a, and the IO_B and IO_F commands are each locked to the engine 303b. Only the IO_C commands may be scheduled to the engine 303c, but there are no IO_C commands available to schedule in the pre-fetch buffer 301. Similarly, only the IO_D commands may be scheduled to the engine 303d, but there are no IO_D commands available to schedule in the pre-fetch buffer 301.

Figure 5:
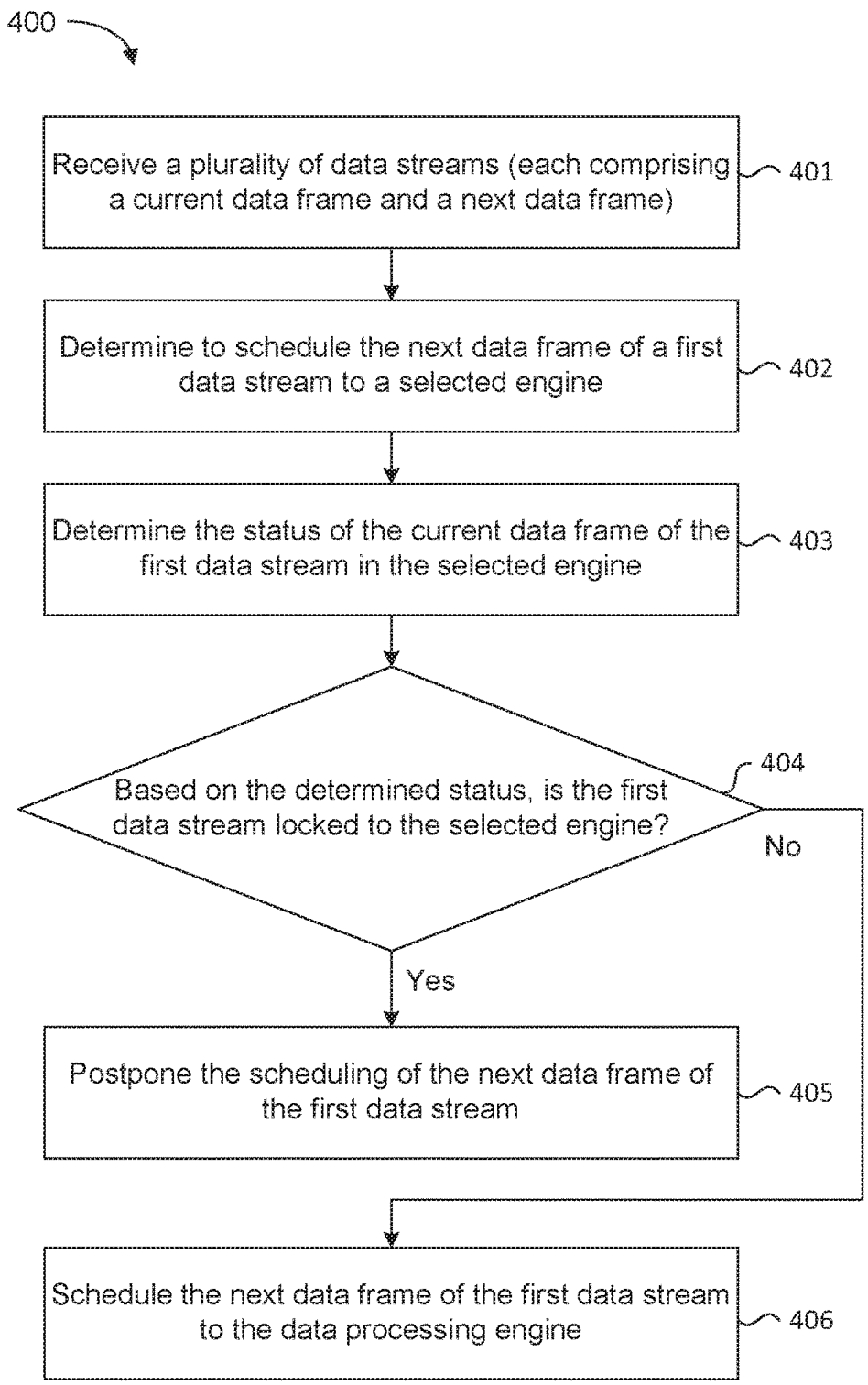
FIG. 5 is a method of scheduling, according to an embodiment of the present disclosure.

FIG. 5 shows a method 400 of scheduling IO commands to the engine 203, according to an embodiment of the present disclosure.

The method 400 comprises, at 401, a processor 200 receiving a plurality of data streams (each data stream comprising sequential data frames including a current data frame and a next data frame). In an embodiment, the processor may create IO commands for each of the data frames and store the IO commands in a pre-fetch buffer 201. The scheduler 202 schedules IO commands to each engine 203a-203n, causing each engine to retrieve and process the corresponding data frame from a memory.

At 402, the processor 200 determines to schedule the next data frame of a first data stream to a selected engine. This determination may include identifying that the selected engine has a free pre-fetch stage 211 for accepting an IO command. This determination may also include determining that the no other engines are currently processing another data frame of the first data stream.

At 403, the processor 200 determines the status of the current data frame of the first data stream in the selected engine. Based on this status, at 404, the processor can determine whether the first data stream is locked to the selected engine.

If the first data stream is locked to the selected engine, the processor 200, at 405, will postpone the scheduling of the next data frame of the first data stream. Later, the processor may schedule the next data frame of the first data stream to the selected engine, or any other engine, depending on a determination of whether the first data stream is locked to any engine.

Otherwise, if the first data stream is not locked to the selected engine, the processor 200, at 406, will schedule the next data frame of the first data stream to the data processing engine.

Figure 6:
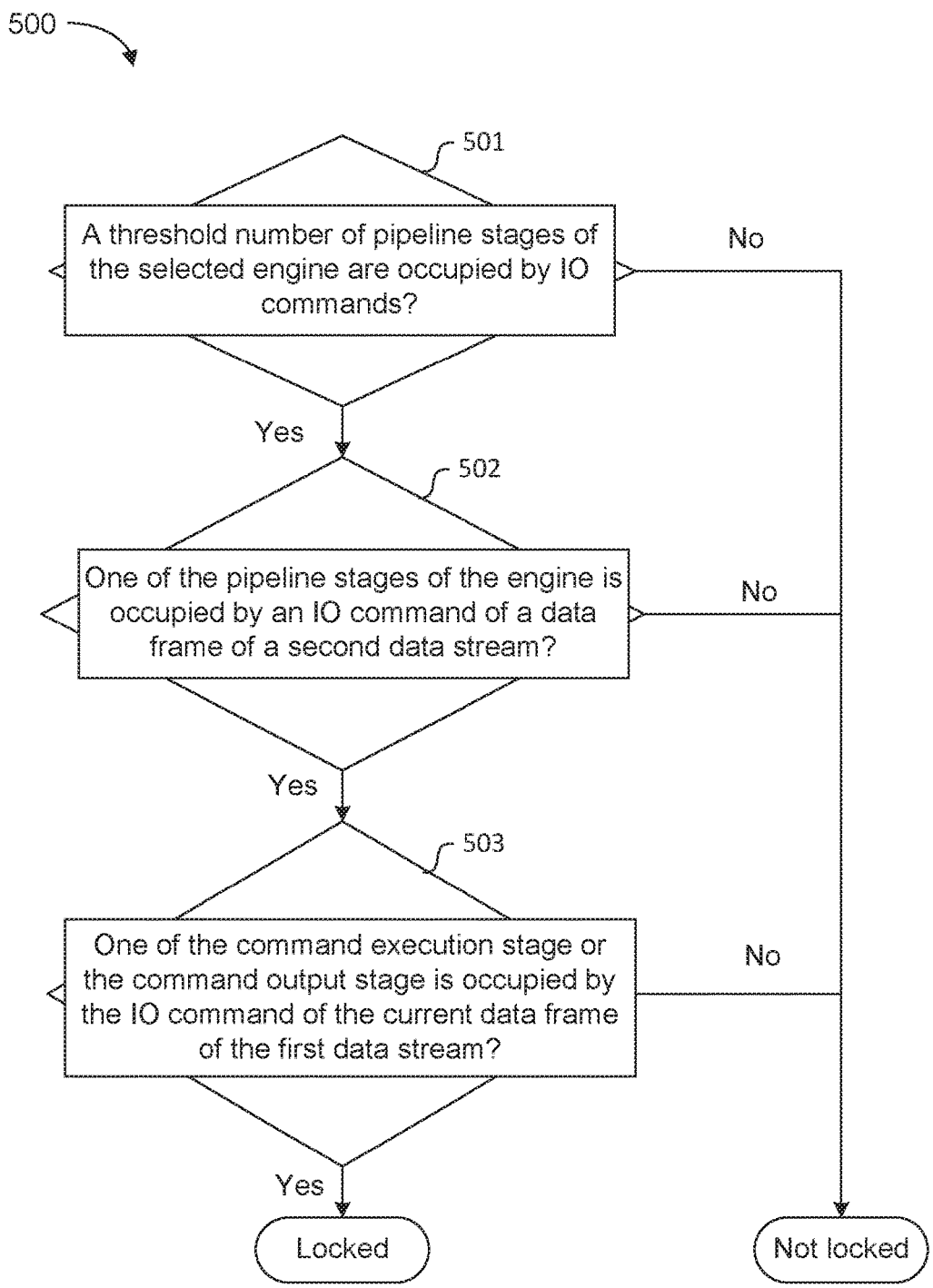
FIG. 6 is a method of determining a locking condition, according to an embodiment of the present disclosure.

FIG. 6 shows a method 500 of determining whether a data stream is locked to an engine based on a status of a data frame in the engine, according to an embodiment of the present disclosure.

At 501, the processor 200 determines whether a threshold number of pipeline stages of the selected engine are occupied by IO commands.

If the threshold is not exceeded, the processor 200 determines that the first data stream is not locked to the engine. In an embodiment, the threshold number is two, given an engine having 4 pipeline stages.

If the threshold is exceeded, the processor 200 proceeds to 502 to determine whether one of the pipeline stages of the selected engine is occupied by an IO command of a data frame of a second data stream. In other words, the processor 200 determines whether the pipeline stages of the engine holds IO commands for at least two different data streams.

If the engine does not hold IO commands for at least two different data streams, the processor 200 determines that the first data stream is not locked to the engine.

If one of the pipeline stages of the selected engine is occupied by an IO command of a data frame of the second data stream, then the processor 200 proceeds to 503 to determine whether one of the command execution stage 213 or the command output stage 214 is occupied by the IO command of the current data frame of the first data stream.

If neither the command execution stage 213 nor the command output stage 214 is occupied by the IO command of the current data frame of the first data stream, then the first data stream is not locked to the selected engine and the processor 200 can schedule the next data frame of the first data stream to the selected engine. Otherwise, the processor 200 determines that the first data stream is locked to the selected engine and the processor 200 will postpone scheduling the next data frame.

In an embodiment, the engine 203 may include more pipeline stages than the stages 211-214 described in the processor 200. Therefore, at 503, the processor 200 will determine whether either of the last two pipeline stages (that is, the two pipeline stages closest to the output of the engine) are occupied by the IO command of the current data frame of the first data stream.

Figure 7A:
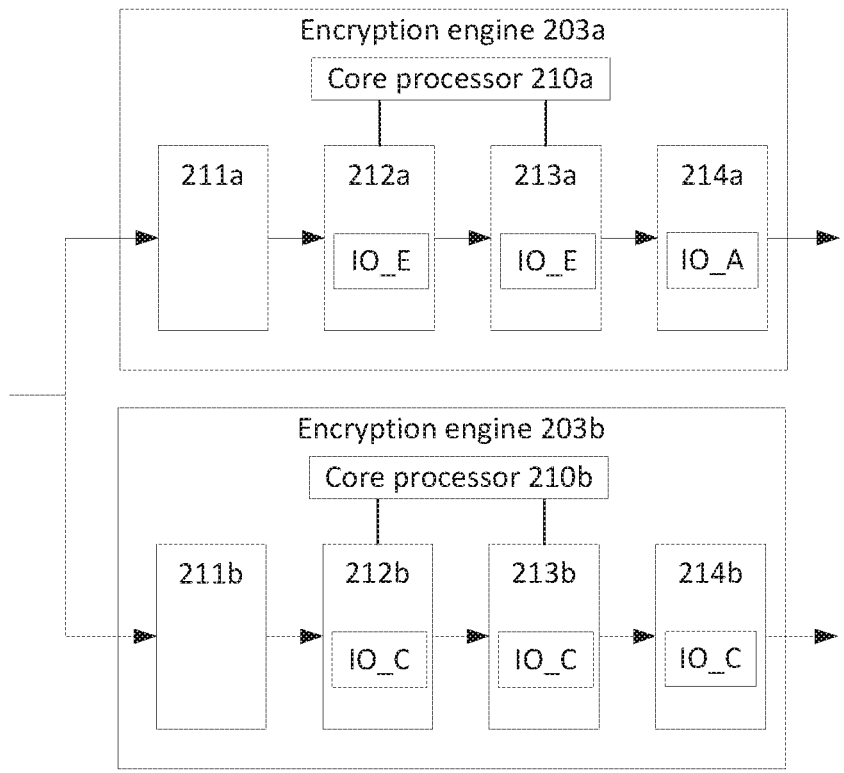
FIG. 7A is a diagram of operating the processor according to an embodiment of the present disclosure.
Figure 7B:
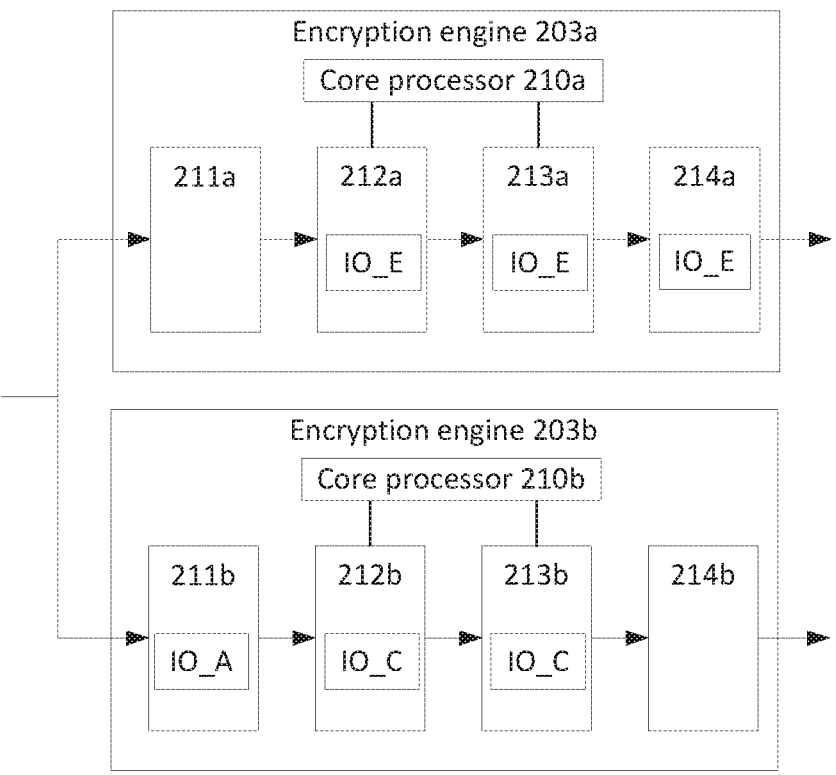
FIG. 7B is a diagram of operating the processor according to an embodiment of the present disclosure.

FIGS. 7a and 7b show a diagram of operating the processor according to the method 500 of FIG. 6. In FIG. 7a, the command scheduler 202 determines that IO_A should be scheduled to engine 203a because the pre-fetch stage 211a is free and a current IO_A command occupies the output stage 214a. At 501, the command scheduler 202 determines that three of the pipeline stages of the engine 203a are occupied. At 502, the command scheduler 202 determines that both IO_A and IO_E commands occupy the pipeline stages of the engine 203a. At 503, the scheduler 202 determines that the last pipeline stage of the engine 203a is occupied by a current IO_A command. Therefore, the scheduler 202 concludes that the data stream of IO_A is locked to the engine 203a.

FIG. 7b shows the outcome of postponing the scheduling of the next IO_A command. The current IO_A command has been removed from the output stage 214a. There is thus no more processing dependency between the IO_A data stream and the engine 203a. Thus, the scheduler 202 can schedule the next IO_A command to the engine 203b and balance the workload between the two engines.

Figure 8:
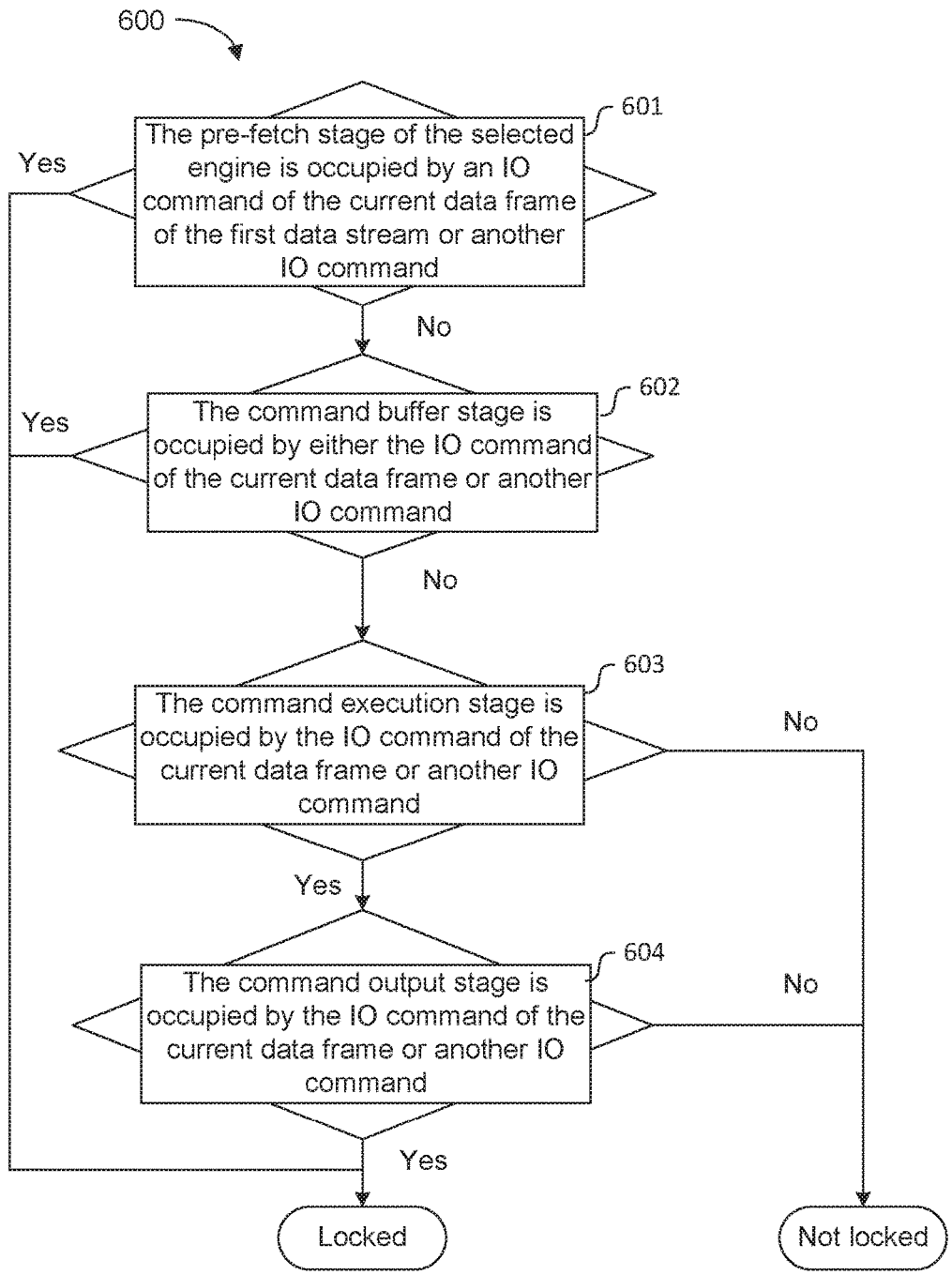
FIG. 8 is a method of determining a locking condition, according to an embodiment of the present disclosure.

FIG. 8 shows a method 600 of determining whether a data stream is locked to an engine based on a status of a data frame in the engine, according to another embodiment of the present disclosure.

At 601, the processor 200 determines whether the pre-fetch stage 211 of the selected engine is occupied by an IO command of the current data frame of the first data stream or another IO command. In other words, the processor 200 determines whether the pre-fetch stage 211 is empty. If any IO command occupies the pre-fetch stage (i.e., the pre-fetch stage is not empty), the processor 200 will determine that the engine is locked and will not schedule the IO command of the current data frame to the engine.

If the pre-fetch stage 211 is empty, the processor 200 proceeds to 602 to determine whether the command buffer stage is occupied by either the IO command of the current data frame or another IO command.

If the condition is satisfied, the processor 200 determines the first data stream is locked to the selected engine, and the processor 200 will postpone the scheduling of the next IO command for the first data stream.

Otherwise, the processor 200 proceeds to 603 to determine whether the command execution stage is occupied by the IO command of the current data frame or another IO command. If not, the first data stream is not locked to the selected engine.

Otherwise, the processor 200 proceeds to 604 to determine whether the command output stage is occupied by the IO command of the current data frame or another IO command. If the condition is satisfied, the first data stream is locked to the selected engine, and the processor 200 will postpone the scheduling of the next IO command for the first data stream. If not, the first data stream is not locked to the selected engine.

Figure 9A:
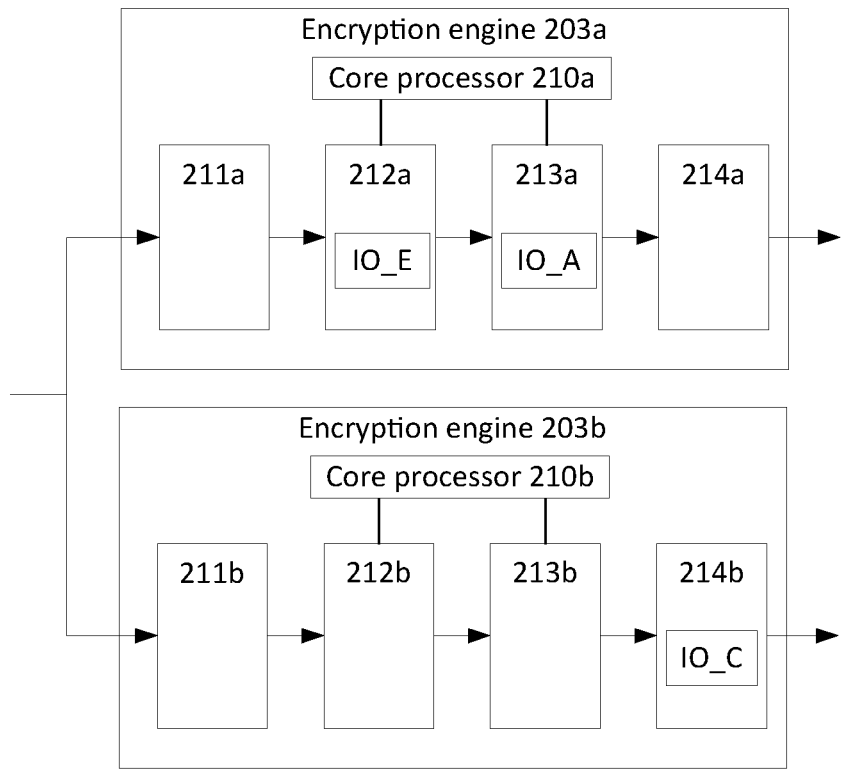
FIG. 9A is a diagram of operating the processor according to an embodiment of the present disclosure.
Figure 9B:
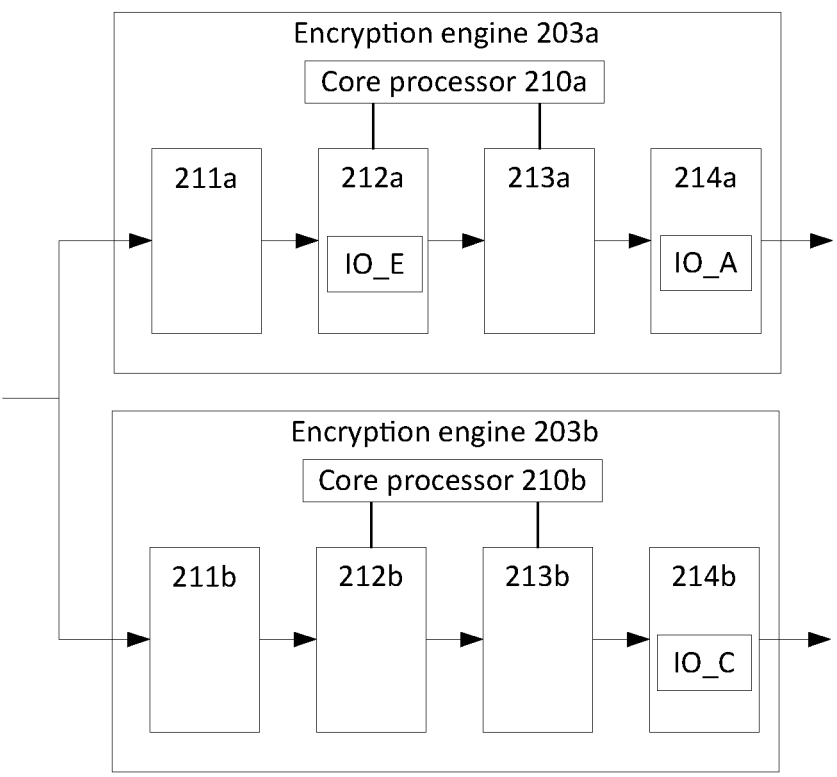
FIG. 9B is a diagram of operating the processor according to an embodiment of the present disclosure.
Figure 9C:
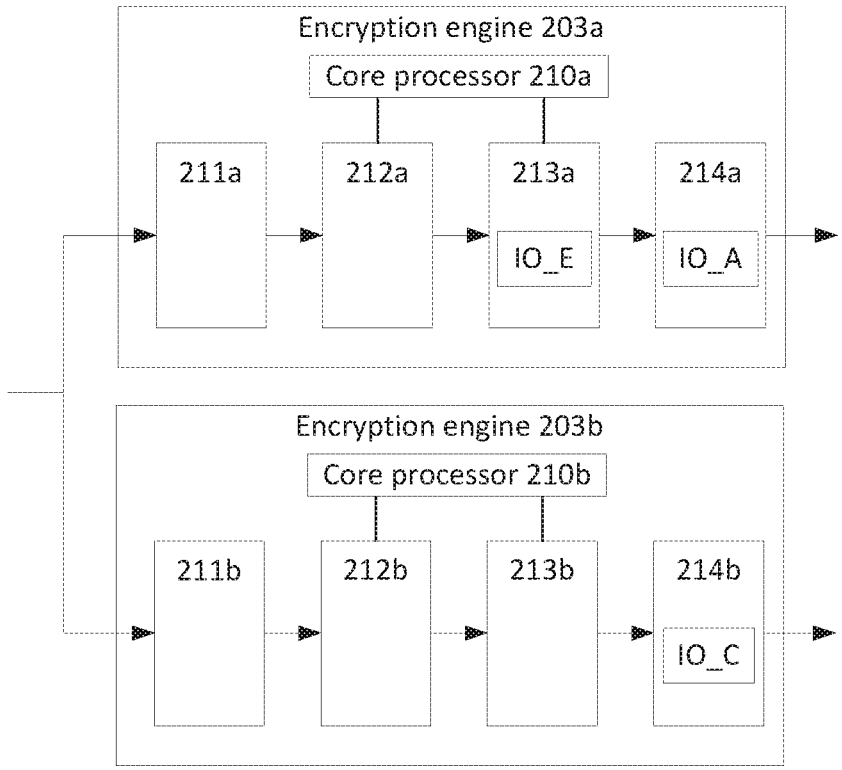
FIG. 9C is a diagram of operating the processor according to an embodiment of the present disclosure.
Figure 9D:
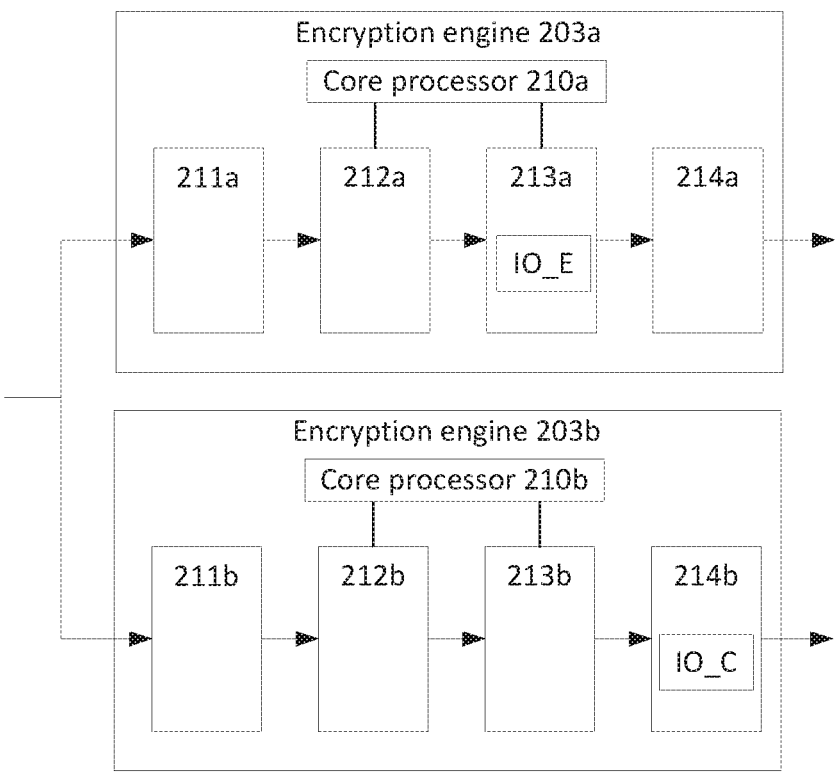
FIG. 9D is a diagram of operating the processor according to an embodiment of the present disclosure.
Figure 9E:
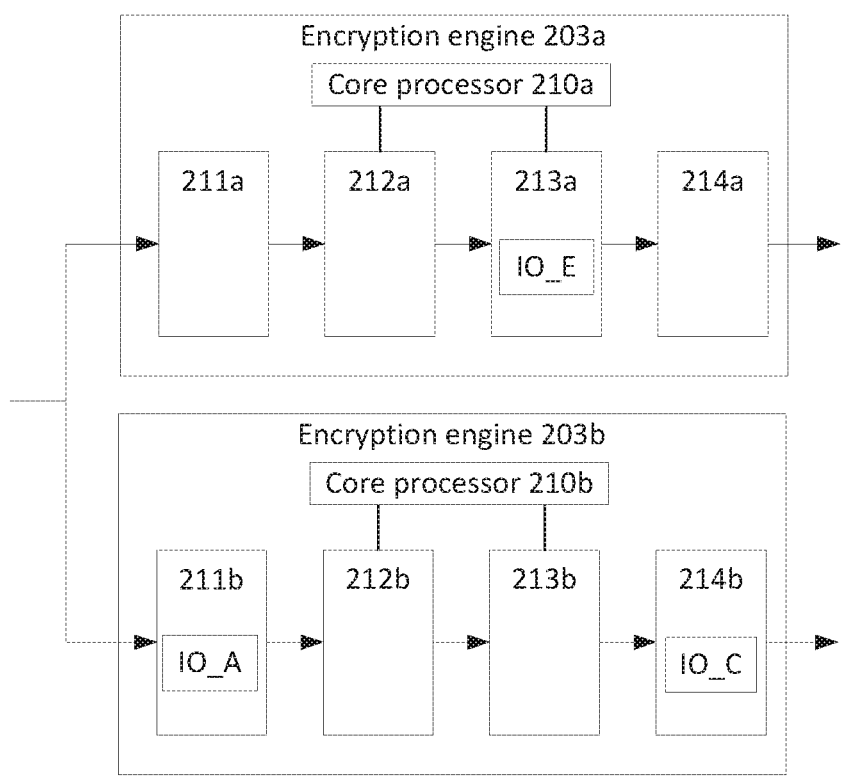
FIG. 9E is a diagram of operating the processor according to an embodiment of the present disclosure.

FIGS. 9a and 9e show a diagram of operating the processor according to the method 600 of FIG. 8. In FIG. 9a, the command scheduler 202 previously determined, according to processing dependency rules, that the next IO_A command should be scheduled to engine 203a because a current IO_A command occupies the execution stage 213a. At 601, the scheduler 202 determines that the pre-fetch stage 211a is empty and proceeds to 602. At 602, the scheduler 202 determines that the buffer stage 212a is occupied by IO_E; therefore, the data stream of IO_A is locked to engine 203a.

In FIG. 9b, the IO_A command has moved to the output stage of the engine 203a. However, the IO_E command remains in the buffer stage; therefore, the data stream of IO_A is still locked to engine 203a.

In FIG. 9c, the IO_E command has moved to the execution stage of the engine 203a. However, at 603 and 604, the scheduler 202 determines that the data stream of IO_A is still locked to engine 203a.

In FIG. 9d, the IO_A command has been removed from the output stage of the engine 203a. Therefore, at 604, the scheduler 202 determines that the data stream of IO_A is not locked to engine 203a.

In FIG. 9e, the scheduler 202 schedules the next IO_A command to the engine 203b.

A processor according to embodiments of the present disclosure may achieve performance gains in difficult operating conditions, such as when the command queue is saturated with IO commands from different data streams. In an example, the processor is an encryption processor of a SAS controller, and the processor comprises four parallel pipelined engines. The performance of each engine of the processor according to the present disclosure may be more consistent, in comparison to a conventional processor, through the range of numbers of interleaved IO commands received at the processor. In particular, when the number of interleaved IO commands received at the processor increases, the throughput performance improvement of an engine of the processor of the present disclosure, over an engine of the conventional processor, may reach approximately 14%.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A method of scheduling data processing at a pipelined data processing engine, the method comprising:
receiving a plurality of data streams, each data stream comprising sequential data frames including a current data frame and a next data frame;
determining whether a first data stream is locked to the pipelined data processing engine based on a status of the current data frame of the first data stream in the pipelined data processing engine;
scheduling the next data frame of the first data stream to the data processing engine if the first data stream is not locked to the pipelined data processing engine; and
postponing the scheduling of the next data frame of the first data stream if the first data stream is locked to the pipelined data processing engine, the pipelined data processing engine comprising a plurality of pipeline stages for receiving and storing input/output (IO) commands comprising instructions for processing data frames,
the plurality of pipeline stages including a command pre-fetch stage, a command buffer stage, a command execution stage, and a command output stage,
the first data stream being locked to the pipelined data processing engine when any one of A, B, C and D occurs:
A being:
  a threshold number of pipeline stages of the pipelined data processing engine are occupied by IO commands,
  one of the pipeline stages of the pipelined data processing engine is occupied by an IO command of a second data stream, and
  one of the command execution stage or the command output stage is occupied by an IO command of the current data frame of the first data stream,
B being:
  the pre-fetch stage of the pipelined data processing engine is occupied by either the IO command of the current data frame of the first data stream or another IO command of another data stream,
C being:
  the command buffer stage is occupied by either the IO command of the current data frame of the first data stream or another IO command of another data stream,
D being:
  the command execution stage is occupied by either the IO command of the current data frame of the first data stream or another IO command, and the command output stage is occupied by either the IO command of the current data frame of the first data stream or another IO command.

2. The method of claim 1, wherein one of the command pre-fetch stage, the command buffer stage, the command execution stage, or the command output stage comprises multiple sub-stages.

3. The method of claim 1, wherein the threshold number is two.

4. The method of claim 1, wherein the pipelined data processing engine is an encryption engine of a Serial Attached Small-Computer-System-Interface (SAS) controller.

5. The method of claim 4, wherein the SAS controller comprises four parallel encryption engines.

6. A processor comprising:
a pipelined data processing engine for processing a plurality of data streams, each data stream comprising sequential data frames including a current data frame and a next data frame, the pipelined data processing engine configured to process the data frames based on instructions contained in input/output (IO) commands; and
a command scheduler for scheduling data processing at the pipelined data processing engine, wherein the command scheduler is configured to:
  receive IO commands corresponding to different data streams, the IO commands comprising a current IO command corresponding to a current data frame of a first data stream, and comprising a next IO command corresponding to a next data frame of the first data stream;
  determine whether the first data stream is locked to the pipelined data processing engine based on a status of the current IO command of the first data stream in the pipelined data processing engine;
  schedule the next data frame of the first data stream to the data processing engine if the first data stream is not locked to the pipelined data processing engine, wherein scheduling the next data frame comprises transmitting the next IO command to the pipelined data processing engine; and
  postpone the scheduling of the next data frame of the first data stream if the first data stream is locked to the pipelined data processing engine,
  the pipelined data processing engine comprising a plurality of pipeline stages for receiving and storing the IO commands,
  the plurality of pipeline stages including a command pre-fetch stage, a command buffer stage, a command execution stage, and a command output stage
  the first data stream being locked to the pipelined data processing engine when any one of A, B, C and D occurs:
A being:
  a threshold number of pipeline stages of the pipelined data processing engine are occupied by IO commands,
  one of the pipeline stages of the pipelined data processing engine is occupied by an IO command of a second data stream, and
  one of the command execution stage or the command output stage is occupied by an IO command of the current data frame of the first data stream,
B being:
  the pre-fetch stage of the pipelined data processing engine is occupied by either the IO command of the current data frame of the first data stream or another IO command of another data stream,
C being:
  the command buffer stage is occupied by either the IO command of the current data frame of the first data stream or another IO command of another data stream,
D being:
  the command execution stage is occupied by either the IO command of the current data frame of the first data stream or another IO command, and the command output stage is occupied by either the IO command of the current data frame of the first data stream or another IO command.

7. The processor of claim 6, wherein one of the command pre-fetch stage, the command buffer stage, the command execution stage, or the command output stage comprises multiple sub-stages.

8. The processor of claim 6, wherein the threshold number is two.

9. The processor of claim 6, wherein the pipelined data processing engine is an encryption engine of a Serial Attached Small-Computer-System-Interface (SAS) controller.

10. The processor of claim 9, wherein the SAS controller comprises four parallel encryption engines.

11. A method of scheduling data processing at a pipelined data processing engine, the method comprising:
receiving a plurality of data streams, each data stream comprising sequential data frames including a current data frame and a next data frame;

determining whether a first data stream is locked to the pipelined data processing engine based on a status of the current data frame of the first data stream in the pipelined data processing engine;

scheduling the next data frame of the first data stream to the data processing engine if the first data stream is not locked to the pipelined data processing engine; and postponing the scheduling of the next data frame of the first data stream if the first data stream is locked to the pipelined data processing engine, the pipelined data processing engine comprising a plurality of pipeline stages for receiving and storing input/output (IO) commands comprising instructions for processing data frames, the plurality of pipeline stages including a command pre-fetch stage, a command buffer stage, a command execution stage, and a command output stage, the first data stream being locked to the pipelined data processing engine when:
- a threshold number of pipeline stages of the pipelined data processing engine are occupied by IO commands, the threshold number being two,
- one of the pipeline stages of the pipelined data processing engine is occupied by an IO command of a second data stream, and
- one of the command execution stage or the command output stage is occupied by an IO command of the current data frame of the first data stream.

* * * * *